(No Model.)

C. JENKINS.
VALVE.

No. 271,073. Patented Jan. 23, 1883.

WITNESSES
Willard C. Fogg
Fred Harris

INVENTOR
Charles Jenkins
by his attys
Clarke & Raymond

UNITED STATES PATENT OFFICE.

CHARLES JENKINS, OF BOSTON, MASSACHUSETTS.

VALVE.

SPECIFICATION forming part of Letters Patent No. 271,073, dated January 23, 1883.

Application filed July 29, 1882. (No model.)

*To all whom it may concern:*

Be it known that I, CHARLES JENKINS, of Boston, in the county of Suffolk and State of Massachusetts, a citizen of the United States, have invented a new and useful Improvement in Valves, of which the following is a full, clear, and exact description, reference being had to the accompanying drawings, forming a part of this specification, in explaining its nature, in which—

Figure 3:
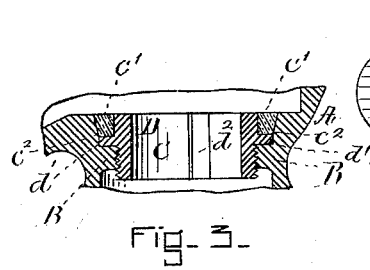
Figure 4:
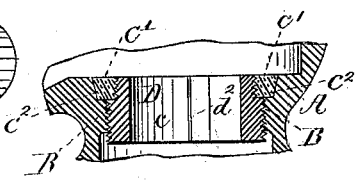
Figure 7:
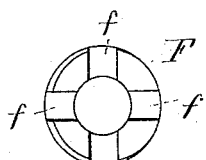
Figure 5:
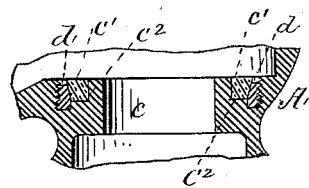
Figure 1:
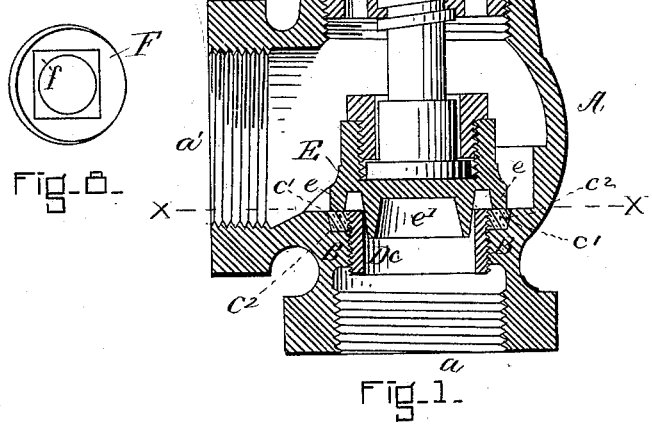
Figure 6:
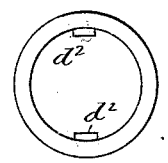
Figure 2:
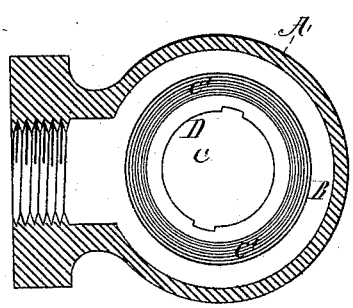

Figure 1 is a view of a valve, part in vertical section and part in elevation, containing my improvement. Fig. 2 is a horizontal section on the line $x\,x$ of Fig. 1. Figs. 3, 4, and 5 represent sections of modified forms of construction hereinafter described. Fig. 6 represents a detail hereinafter described. Figs. 7 and 8 are plan views of a portion of the stuffing-box about the valve-spindle.

This invention relates, first, to the means herein described for securing packing in a valve-seat in a manner to provide for its ready removal and renewal, and, second, in means for securing the packing of a valve or other spindle to the cap of the valve or stationary part of the stuffing-box, so that the remainder may be unscrewed and the packing remain in place. This construction is very desirable, as it is often necessary to open the stuffing-box to expose, inspect, or renew the packing, or for other purposes. Heretofore the construction has been such that the packing remains in the movable part of the stuffing-box, instead of adhering to the part that is uncovered, and thereby more or less trouble is occasioned in reaching the packing.

Referring to the drawings, A represents the casing of the valve; $a$, the induction-way; $a'$, the eduction-way; B, the valve-diaphragm in which the steam or water way $c$ is formed, and in or to which the seat $c'$ is made or secured. This seat may be of a flexible or elastic nature, like the Jenkins packing, or of soft metal, or of other suitable material, and it is secured in a recess, $c^2$, in the diaphragm, which has for one of its walls the inner ring, D, or the outer ring, $d$, as may be desired. This recess is made wider at the top than at the bottom in order that the packing may be easily removed. The ring D may be made to screw into the packing and the seat, as shown in Fig. 1; or it may have a projecting rib, $d'$, upon which the packing may rest, and forming the bottom of the packing-holding recess shown in Fig. 3; or it may be formed as shown in Fig. 4; or, in lieu of said ring, the ring $d$, forming the outside wall of the packing-recess, as shown in Fig. 5, may be used. The position of the ring in relation to the packing is not material, so long as it forms one of the walls of the packing-holding recess, whereby upon its removal the packing is removed with it, or easy access to the packing, whereby its removal may be effected, is obtained.

The ring D may have recesses, lugs, or projections $d^2$ for use in screwing and unscrewing the same from the diaphragm.

It will be observed that by the construction herein described the packing is protected from the direct action of the strain, which is an advantage.

The valve-head E is provided with the raised or projecting annular seating portion $e$, which shuts upon the packing, and is in width a little less than the width of the packing, and also with the extension $e'$, which enters the steam or water way and serves to center the valve-head as it is seated.

The upper portion of the cap F is provided with the recesses or sunken portions $f$, in which the packing $f'$ is compressed by the movable part $f^2$ of the stuffing-box, and the packing is thereby securely held to the cap, so that upon unscrewing the part $f^2$ of the stuffing-box it will remain in place upon the cap F, and not in the part $f^2$, unscrewing therefrom.

Having thus fully described my invention, I claim and desire to secure by Letters Patent of the United States—

1. A valve-cap or other stationary part of a stuffing-box having holes or recesses in which the packing is compressed, and by which it is held while the remainder of the stuffing-box is unscrewed, all substantially as and for the purposes described.

2. The combination of the cap F, having the holes $f$, the packing $f'$, and the movable part $f^2$ of the stuffing-box, all substantially as and for the purposes described.

3. The combination of the diaphragm B and the removable ring D, having a projection or shoulder, $d'$, with the packing $c'$, all substantially as and for the purposes described.

4. The combination, in a valve, of the diaphragm B, the removable ring D, and the resilient or elastic packing $c'$, with the valve E, having the seat $e$, all substantially as and for the purposes described.

5. In a valve, the combination of the diaphragm B and ring D, whereby the packing-holding recess $c^2$ is formed, as described, one wall of which recess is inclined from the lower portion thereof outwardly, with the resilient or elastic packing $c'$, all substantially as and for the purposes described.

CHARLES JENKINS.

Witnesses:
F. F. RAYMOND, 2d,
W. CLIFTON FOGG.